May 22, 1956 A. N. HOWARTH 2,747,173

TAXIMETER INDICATORS

Filed May 13, 1952 2 Sheets-Sheet 1

INVENTOR.
ARTHUR NEVILLE HOWARTH
BY
Busser, Smith & Harding
ATTORNEYS

May 22, 1956 A. N. HOWARTH 2,747,173

TAXIMETER INDICATORS

Filed May 13, 1952 2 Sheets-Sheet 2

*INVENTOR.*
ARTHUR NEVILLE HOWARTH
BY
Busser, Smith & Harding
ATTORNEYS

United States Patent Office 2,747,173

Patented May 22, 1956

2,747,173

TAXIMETER INDICATORS

Arthur Neville Howarth, London, England, assignor to Bell Punch Company Limited, London, England, a British company Application May 13, 1952, Serial No. 287,453

Claims priority, application Great Britain May 18, 1951

4 Claims. (Cl. 340—68)

This invention relates to taximeter indicators, by which is meant devices to indicate to the public and to the authorities the state at which the mechanism of a taximeter is set.

According to the invention, a taximeter indicator as thus defined comprises an electrically illuminated panel the area of illumination of which is subdivided into a plurality of separate portions allocated respectively to a corresponding plurality of indications to appear on the panel, each corresponding to a particular setting of the taximeter mechanism, in combination with switching means operatively connected to a part of the taximeter mechanism whose position varies with the setting of the mechanism, for controlling the lamp circuits of the panel in such a manner that the respective portions of the panel are illuminated automatically in dependence upon the setting of the taximeter mechanism.

The indications to appear on the panel may, for example, be the three indications (1) that the vehicle is available for use by the public and that the fare calculating mechanisms of the meter are out of action, (2) that the vehicle is being used by a fare paying passenger and that the fare calculating mechanisms are in full operation, (3) that the vehicle is still being used by a fare paying passenger but that the fare is being recorded by the "distance travelled" mechanism only, the time element being out of action. In this case the area of illumination of the panel would be subdivided correspondingly into three separate portions allocated respectively to three indications, for example, the words "For Hire," "Hired" and "Stopped," it being understood, however, that other words having similar but local meaning could, if desired, be substituted for the three words mentioned, and also that the number of separate portions into which the area of illumination of the panel is subdivided could be any number and not necessarily three, according to the number of operative settings of the taximeter mechanism.

The indications may be either of respectively different color or all of the same color, the color or colors of the ground portion of the panel being suitably chosen to throw the indications into strong relief.

The several indications (e. g. the words "For Hire," "Hired" and "Stopped") may be so arranged in the panel behind mechanical optical screens, for example wire gauze or translucent glass, that unless illuminated, they are not usefully visible.

The illuminating lamps of the panel will usually be of such power that the indications are readily visible by day or night.

The panel may be constructed either as a separate unit from the taximeter or as a part of the taximeter. In the former case it may be designed for mounting either upon the casing of the taximeter or upon a part of the vehicle installed with the taximeter. In either case the switching means would generally be situated within the casing of the taximeter along with the fare registering mechanism and other interior parts thereof.

It will be appreciated that the fact that at all times, while the vehicle is in service or available for service, one or other of the indications is made visible, is a safeguard to the public, demanded by some authorities and desirable in all cases to insure that the driver in charge of the vehicle is fulfilling the obligations to the public for whose service he and his vehicle are licensed.

It may also be remarked that the well known "For Hire" roof sign at present used on taximeters is illuminated only while the vehicle is unoccupied, and does nothing to indicate to the authorities that, when in use, the taximeter mechanism is set at the appropriate fare calculating position. In this respect it is fundamentally distinguished from the indicator panel of the present invention.

The invention will now be further described with reference to the accompanying drawings, which illustrate a generally preferred construction by way of example, as applied to the case where the panel is designed as a separate unit from the taximeter in the manner hereinbefore described.

In the drawings.

Like reference characters are applied to like parts in the various figures.

Figure 1:
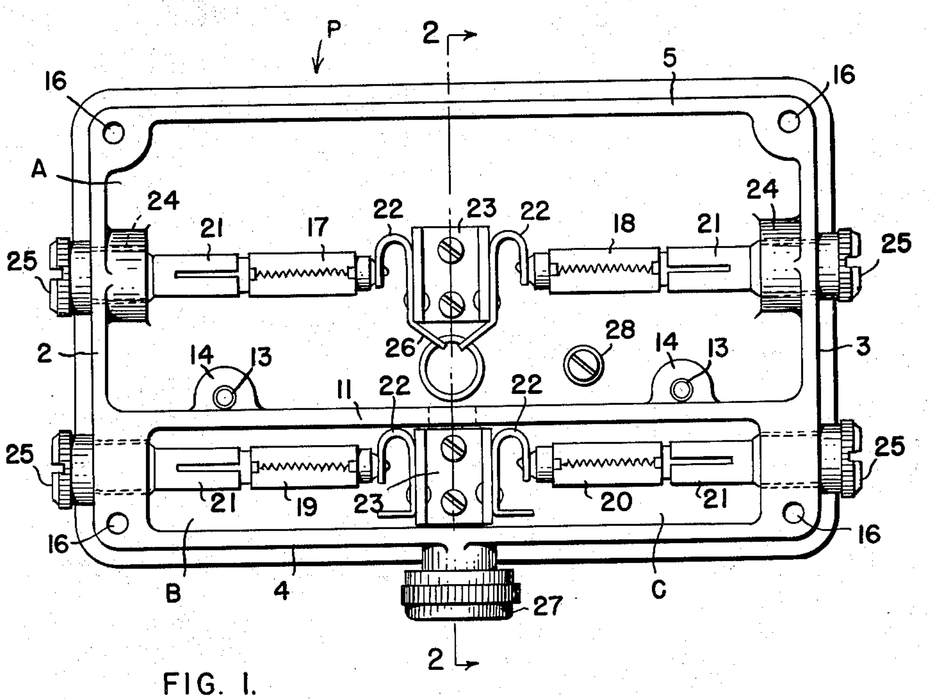
Figure 1 is a front elevation of the panel with the front cover thereof removed.

The panel illustrated in the drawings comprises a casing interiorly subdivided into compartments A, B, C, respectively lying behind the several portions (which in the panel shown are three in number) into which the area of illumination of the panel is divided, there being separate lamps for the illumination of the panel in the several compartments.

Figure 2:
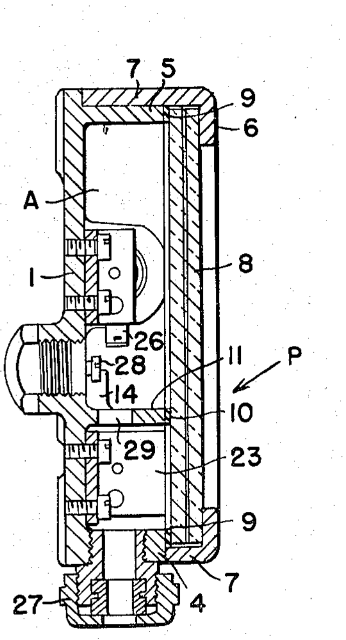
Figure 2 is a vertical section through the panel on the section line 2—2 of Figure 1 with the front cover in position.

The casing of the panel comprises a rear wall 1, two side walls 2, 3, a bottom wall 4, a top wall 5 and a front cover 6, said front cover being formed with a rearwardly extending flange 7 which telescopes over the side, bottom and top walls 2, 3, 4, 5 of the casing in the manner clearly shown in Figure 2.

Clamped between the cover 6 and the forwardly presented edges of the side, bottom and top walls 2, 3, 4, 5 of the casing is the sign glass 8 of the panel, there being inserted in the joint between the sign glass and said forwardly presented edge of the walls 2, 3, 4, 5 a rubber or other gasket 9. A similar gasket 10 is inserted between the sign glass 8 and the forwardly presented edge of a horizontal partition 11 formed integrally with the rear wall and the two side walls of the casing and serving to divide the interior space of the casing vertically thereof in the manner shown in the drawings, the partition forming the lower bounding wall of the upper compartment A of the panel and at the same time the upper bounding wall of the two lower compartments B, C.

Figure 3:
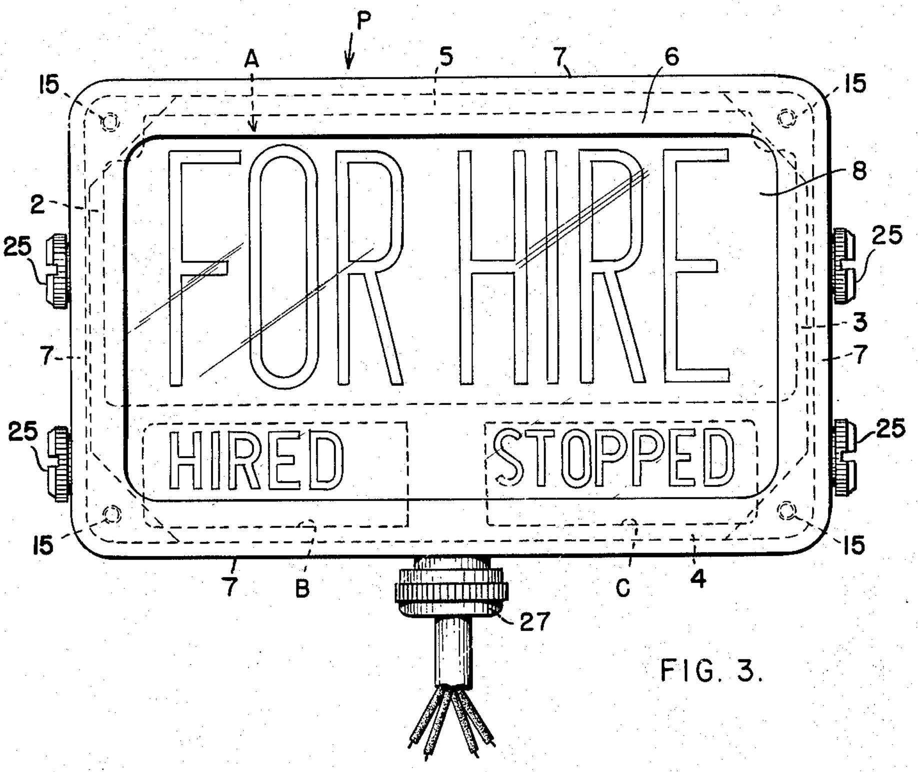
Figure 3 is a front elevation of the panel with the front cover in position.

As will be understood, the sign glass carries the indications to appear on the panel, namely the words "For Hire" opposite the upper compartment A, the word "Hired" opposite the left-hand lower compartment B and the word "Stopped" opposite the right-hand lower compartment C in the manner illustrated in Figure 3, which shows the outline of the three compartments A, B, C in broken line.

Figure 4:
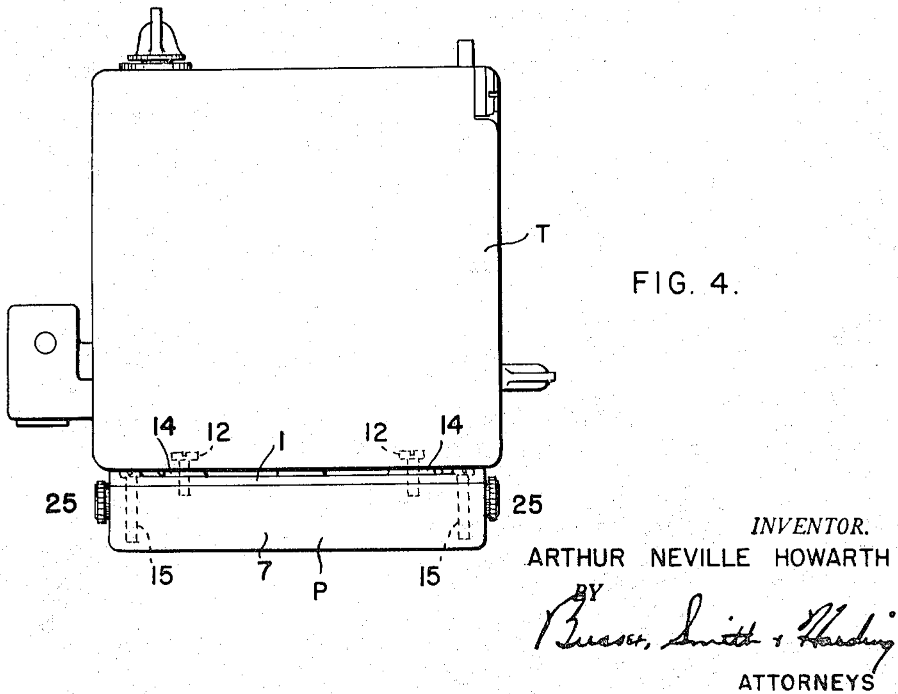
Figure 4 is a plan view of the panel (looking down on the top thereof) in position on the taximeter.

The cover 6 is retained in position on the casing by means of four screws situated respectively at the four corners of the panel. These screws are disposed with their heads towards the rear of the casing and therefore towards the taximeter upon which the panel is mounted in the manner indicated in Figure 4, wherein the taximeter is marked T and the panel P, the panel being secured to the taximeter by means of two screws 12, the heads of which are located within the taximeter casing and the shanks of which screw into tapped holes 13 provided to receive them in lugs 14 formed integrally with the rear wall 1 and the partition 11 of the casing. The four screws which secure the cover in position are marked 15 in Figure 4 and their shanks extend through holes 16 formed to receive them in the respective corners of the casing, the screw threaded end portions of the shanks screwing also into tapped holes provided to receive them in the four corners of the cover. In virtue of this arrangement, as regards the manner of securing the cover 6 to the casing of the panel and the panel as a whole to the taximeter, it is impossible to remove the cover of the panel without first opening up the casing of the taximeter and this, as will be appreciated, constitutes a factor of safety against tampering with the interior parts of the panel.

In the panel illustrated there are two lamps, marked respectively 17, 18 in the upper compartment A of the panel, a third lamp 19 in the left-hand lower compartment B and a fourth lamp 20 in the right-hand lower compartment C.

The lamps 17, 18, 19, 20 are of the type in which the opposite poles of the filament are located at opposite ends of the lamp bulb, one of the poles being arranged to make contact with a cooperating pole in a lamp socket 21 in which the lamp is mounted, and the other being arranged to make contact with a spring contact 22 mounted upon a fixed contact carrier 23 in turn mounted upon the rear wall 1 of the casing of the panel. The arrangement shown is one in which there are two fixed contact carriers 23, one in the upper compartment A serving to support both of the spring contacts 22 of the respective lamps 17, 18 and one serving to support the spring contacts 22 of the lower pair of lamps 19, 20 and at the same time to form the dividing wall between the two lower compartments B, C of the casing.

The arrangement as regards the lamps is further such that, in the case of each lamp, the latter as a unit with its socket 21 is introducible into position and removable therefrom through a hole provided for this purpose in the side wall 2 or 3 of the casing, which hole can be tapped as at 24 for screw threaded engagement with a plug 25 carrying the lamp socket and adapted to be screwed into the hole.

The spring contacts 22 are formed with tail portions 26 by which the respective current leads to the lamps are connected to the contacts. These leads enter the casing by way of a tubular plug 27 screwed into the bottom wall 4 of the casing. Four leads enter the casing thus, one leading to the upper pair of spring contacts 22, another to the left-hand lower spring contact 22, another to the right-hand lower spring contact 22 and the fourth to an earthing screw 28 screwing into a tapped hole provided to receive it in the rear wall 1 of the casing. The leads to the upper pair of spring contacts and the earthing screw 28 extend through a hole 29 provided for their reception in the partition 11.

Figure 5:
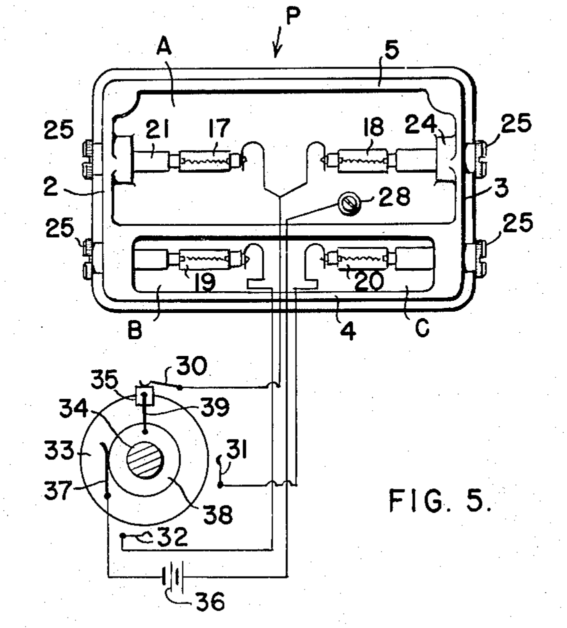
Figure 5 is a wiring diagram showing the electric lamp circuits of the panel and the switching means therefor.

As shown in Figure 5, which is largely a diagrammatic view and which therefore is not intended to illustrate constructional details, the four current leads entering the panel in the manner above described lead from a switching means comprising (in the particular embodiment of the invention shown) a series of stationary contacts 30, 31, 32 connected, the contact 30 to the upper pair of lamps of the panel, the contact 31 to the right-hand lower lamp and the contact 32 to the left-hand lower lamp; a rotary contact carrier 33 fast with the flag spindle of the taximeter, or with a part in operative connection therewith in such a manner as to be rotatable in unison with the spindle, which spindle or part is marked 34 in the figure; a contact 35 carried on the rotary contact carrier 33 so as to be capable of wiping the contacts 30, 31, 32 in succession as the carrier rotates in consequence of rotation of the flag spindle, thereby establishing electrical connection as between the respective lamps or pairs of lamps and a battery 36 included in the electrical circuit thereof by way of a contact brush 37 wiping a cylindrical contact 38 on the contact carrier 33, said contact 38 being connected to the contact 35 through a connection 39.

It will be appreciated that any other convenient arrangement may be employed as regards the switching means and the electrical connections therefrom to the lamps. Also although in the description of the switching means only three stationary contacts are referred to, there may be any necessary number of stationary contacts other than three, suitably connected to the lamps of the panel, according for example to the number of operative positions of the flag spindle of the taximeter. For example, there may be more than one operative position of the flag spindle in which the lamp of the lower left-hand compartment or the lamp of the lower right-hand compartment of the panel is required to be illuminated, in which case there would be a corresponding plurality of stationary contacts 32 or 31 as the case may be, and the same applies to the upper pair of lamps in the compartment A of the panel. Again, the obverse of the arrangement described may, if desired, be employed, in the sense that in this case the rotary contact carrier 33 would carry a series of contacts respectively connected to the lamps of the panel and arranged to be wiped by a single stationary contact. Again, a rotary contact arm may be employed in place of a rotary contact plate in either of the arrangements described above. All such variations are to be understood as within the scope of the invention.

Other variations are also possible, for example as regards the number of illuminated areas in the panel, the type of lamps used therein, the manner of mounting the lamps and the general constructional details of the casing and cover of the panel, the particular constructional form of the invention describd above and illustrated in the drawings being merely a generally preferred form in the case mentioned where the panel is designed as a separate unit from the taximeter, to be mounted upon the exterior thereof.

Finally, it will be understood that the panel of the present invention will generally take the place of the usual flag of a taximeter.

What is claimed is:

1. A taximeter indicator comprising a panel, a cover mounted on said panel and having a plurality of separate areas to be illuminated corresponding respectively to a plurality of indications to appear on the cover, each indication corresponding to a particular setting of a taximeter mechanism, lamps for illuminating said areas selectively, said lamps being of the type in which opposite terminals of the filaments are located at opposite ends of the lamps, means mounting and electrically connecting each of said lamps, each of said mounting means comprising a lamp socket receiving one end of a lamp and a spring contact engaging the other end of a lamp, contact carriers mounted on said panel and mounting said spring contacts, and openings in said panel mounting said lamp sockets.

2. A taximeter indicator comprising a panel, a cover mounted on said panel and having a plurality of separate areas to be illuminated corresponding respectively to a plurality of indications to appear on the cover, each indication corresponding to a particular setting of a taximeter mechanism, lamps for illuminating said areas selectively, said lamps being of the type in which opposite terminals of the filaments are located at opposite ends of the lamps, means mounting and electrically connecting each of said lamps, each of said mounting means comprising a lamp socket receiving one end of a lamp and a spring contact engaging the other end of a lamp, contact carriers mounted on said panel and mounting said spring contacts, and threaded openings in said panel mounting said lamp sockets.

3. A taximeter indicator comprising a panel, a cover mounted on said panel and having a plurality of separate areas to be illuminated corresponding respectively to a plurality of indications to appear on the cover, each indication corresponding to a particular setting of a taximeter mechanism, lamps for illuminating said areas selectively, said lamps being of the type in which opposite terminals of the filaments are located at opposite ends of the lamps, means mounting and electrically connecting each of said lamps, each of said mounting means comprising a lamp socket receiving one end of a lamp and a spring contact engaging the other end of a lamp, contact carriers mounted on said panel and mounting said spring contacts, and openings in said panel mounting said lamp sockets through which lamps within said panel may be replaced.

4. A taximeter indicator for indicating fare rate settings of a taximeter comprising a panel forming a unit separate from the taximeter but constructed and arranged to be mounted on the taximeter case, means releasable only from the interior of the taximeter case for securing the panel to the case, a cover on said panel including a plurality of separate areas adapted to be illuminated corresponding respectively to a plurality of indications to appear on the panel, and means releasable only when the panel is removed from the taximeter case for securing the cover to the panel.

References Cited in the file of this patent

UNITED STATES PATENTS

| | | |
|---|---|---|
| 1,780,780 | Constuma et al. | Nov. 4, 1930 |

FOREIGN PATENTS

| | | |
|---|---|---|
| 138,807 | Great Britain | Feb. 19, 1920 |
| 186,097 | Great Britain | Sept. 29, 1922 |